United States Patent [19]
Kuribayashi et al.

[11] Patent Number: 5,742,108
[45] Date of Patent: Apr. 21, 1998

[54] VEHICLE GENERATOR HAVING DUCT COVER

[75] Inventors: Masaru Kuribayashi; Katsumi Adachi, both of Hyogo, Japan

[73] Assignee: Mitsubishi Denki Kabushiki Kaisha, Tokyo, Japan

[21] Appl. No.: 344,598

[22] Filed: Nov. 18, 1994

[30] Foreign Application Priority Data

May 6, 1994 [JP] Japan ..................................... 6-094357

[51] Int. Cl.[6] ............................................. H02K 11/00
[52] U.S. Cl. ............................... 310/89; 310/58; 310/59; 126/85 B; 126/307 R
[58] Field of Search ........................... 126/307 R, 85 B; 310/58, 59, 89, 88

[56] References Cited

U.S. PATENT DOCUMENTS

| | | | |
|---|---|---|---|
| 3,757,751 | 9/1973 | Kitchin et al. | 123/119 CG |
| 3,848,308 | 11/1974 | Kaval | 29/157 A |
| 4,087,707 | 5/1978 | Shinoda et al. | 310/63 |
| 4,680,493 | 7/1987 | Ziegler et al. | 310/62 |
| 4,926,081 | 5/1990 | DiFlora et al. | 310/89 |
| 5,018,370 | 5/1991 | Tsuchiya | 66/55 |
| 5,141,407 | 8/1992 | Ramsey et al. | 417/292 |
| 5,200,658 | 4/1993 | Kohno et al. | 310/89 |
| 5,200,659 | 4/1993 | Kohno et al. | 310/89 |
| 5,201,111 | 4/1993 | Prohaska | 29/596 |

*Primary Examiner*—Steven L. Stephan
*Assistant Examiner*—Timothy A. Williams
*Attorney, Agent, or Firm*—Sughrue, Mion, Zinn, Macpeak & Seas, PLLC

[57] ABSTRACT

A vehicle generator has a duct cover for coding the generator body with a structure in which either one of the duct cover or a duct can be adjustably rotated in a circumferential direction of a bracket end and can be attached to the bracket end so as to set an intake vent of the duct at the optimal position in the bracket end, wherein the duct cover has a single shape irrespective of the type of engine the type of vehicle and the arrangement of the engine room in which it is used, resulting in a reduction of cost of fabrication of the generator.

8 Claims, 10 Drawing Sheets

VEHICLE GENERATOR HAVING DUCT COVER

BACKGROUND OF THE INVENTION

1. Field of the Invention

The present invention relates to a vehicle generator having a duct cover attached to an end surface of a generator body, for introducing outside air through a duct.

2. Description of the Related Art

Figure 1:
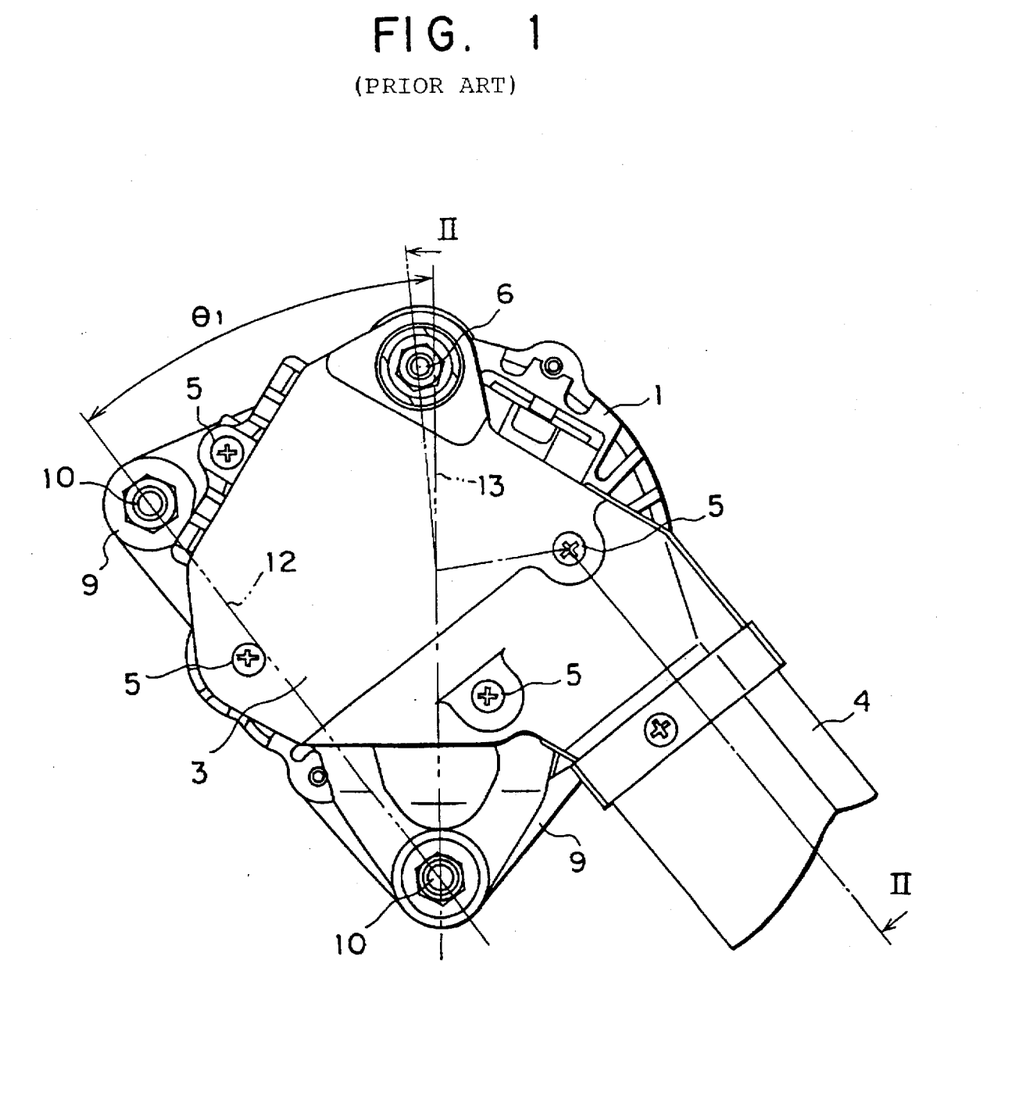
FIG. 1 is an end surface view of a conventional vehicle generator as seen from the rear side.
Figure 2:
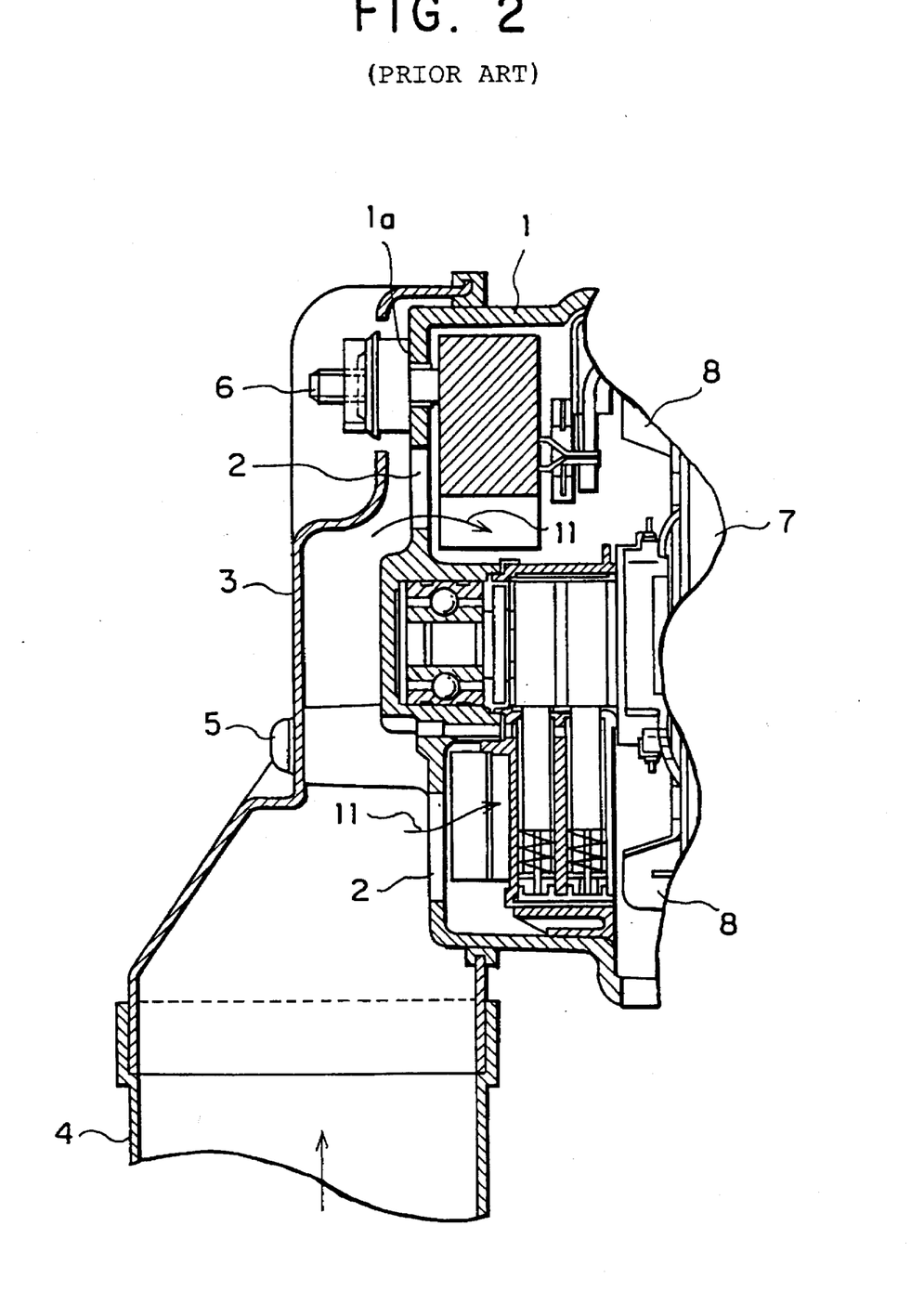
FIG. 2 is a sectional view taken along line II—II of FIG. 1.

FIG. 1 is an end surface view of a conventional vehicle generator as seen from the rear side, and FIG. 2 is a sectional view taken along line II—II of FIG. 1. In FIGS. 1 and 2, reference numeral 1 indicates a rear side bracket, and an intake vent 2 is provided in an end surface 1a. Reference numeral 3 indicates a duct cover attached to cover the end surface 1a of the rear side bracket 1, and 4 is duct which is coupled to duct cover 3 and is also connected to an opening (not shown) for introducing air from outside an engine room. Further, reference numeral 5 indicates a mounting screw to attach the duct cover 3 to the rear side bracket 1, 6 is an output terminal of the generator, and 7 is a rotator having a fan 8. Reference numeral 9 indicates a mounting flange of the generator. A fixing bolt 10 passes through the mounting flange 9 to mount the generator to an engine (not shown).

In order to cool the generator with air, the fan 8 for generating cooling air is attached to the end surface of the rotator 7 provided in the generator. Thus, by rotating the rotator 7, an axial intake operation is effected as typically shown by arrows 11. After each section in the generator is cooled, the intake air is exhausted in a centrifugal direction. However, the vehicle generator is mounted in the engine room, and the inside of the engine room may become hot. It is possible to avoid aggravating this undesirable condition by introducing, through the duct 4, air from outside the engine room having a lower temperature than the ambient temperature in the engine room, into the intake vent 2 in the rear side bracket 1.

In the vehicle generator of this type, a different relationship is, for different engines, between the positions of the two fixing bolts 10 to fix the generator to the engine as shown in FIG. 1 and a position of the output terminal 6.

In addition, fixing positions of the fixing bolts 10 depend upon the type of engine mounted on the vehicle, or the arrangement of the engine in the vehicle. For example, in the embodiment shown in FIG. 1, a line 12 connecting the two fixing bolts 10 forms an angle $\theta_1$ to the left of a reference line 13 intersecting a center of the lower bolt 10 in the engine room. In another embodiment shown in FIG. 3, a line 12 connecting two fixing bolts 10 forms an angle $\theta_2$ less than the angle $\theta_1$ with respect to a reference line 13. In still another embodiment shown in FIG. 4, a line 12 connecting two fixing bolts 10 forms an angle $\theta_3$ to the right of a reference line 13.

Figure 3:
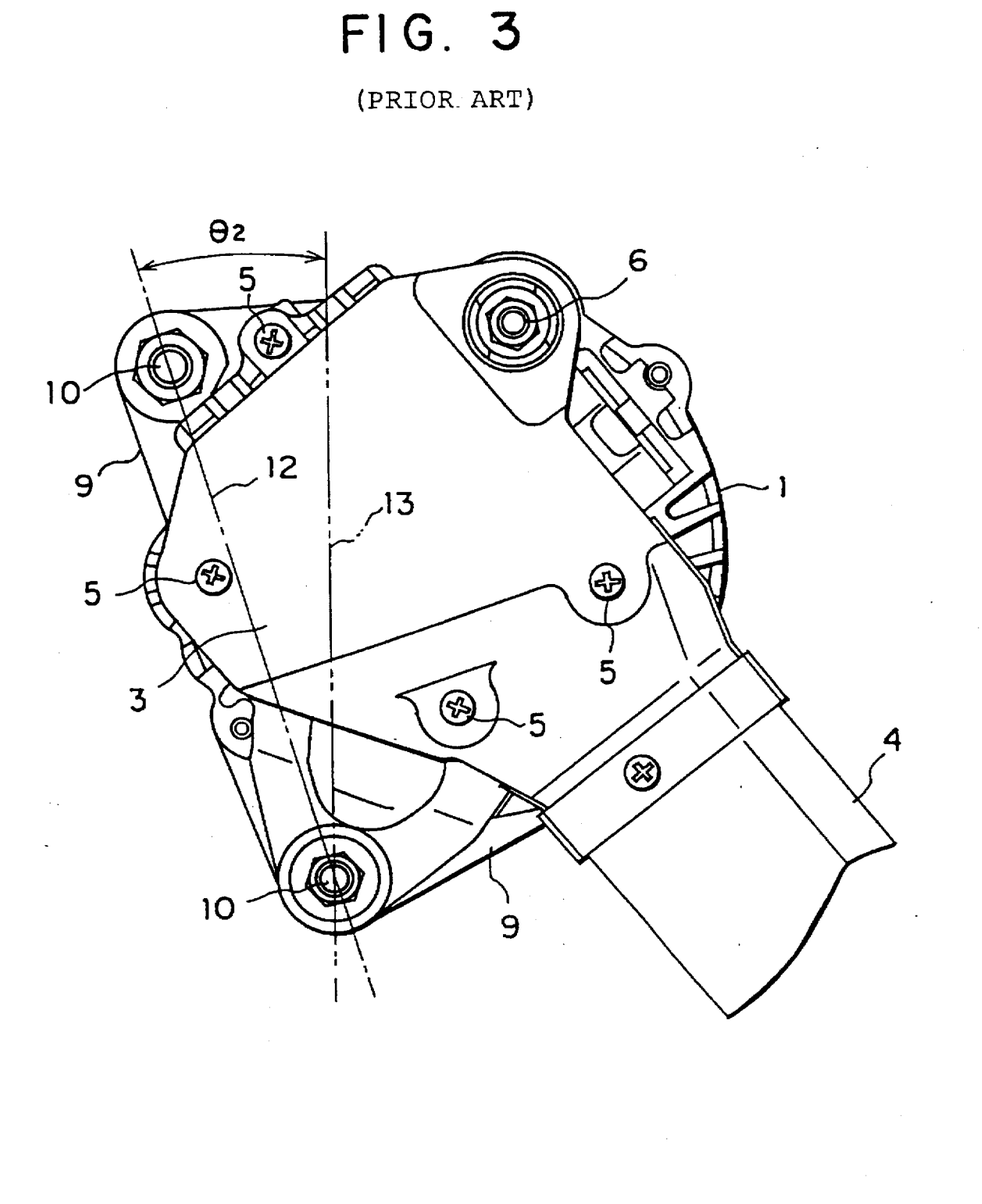
FIG. 3 is a view showing a conventional duct cover having a shape different from a duct cover shape shown in FIG. 1.
Figure 4:
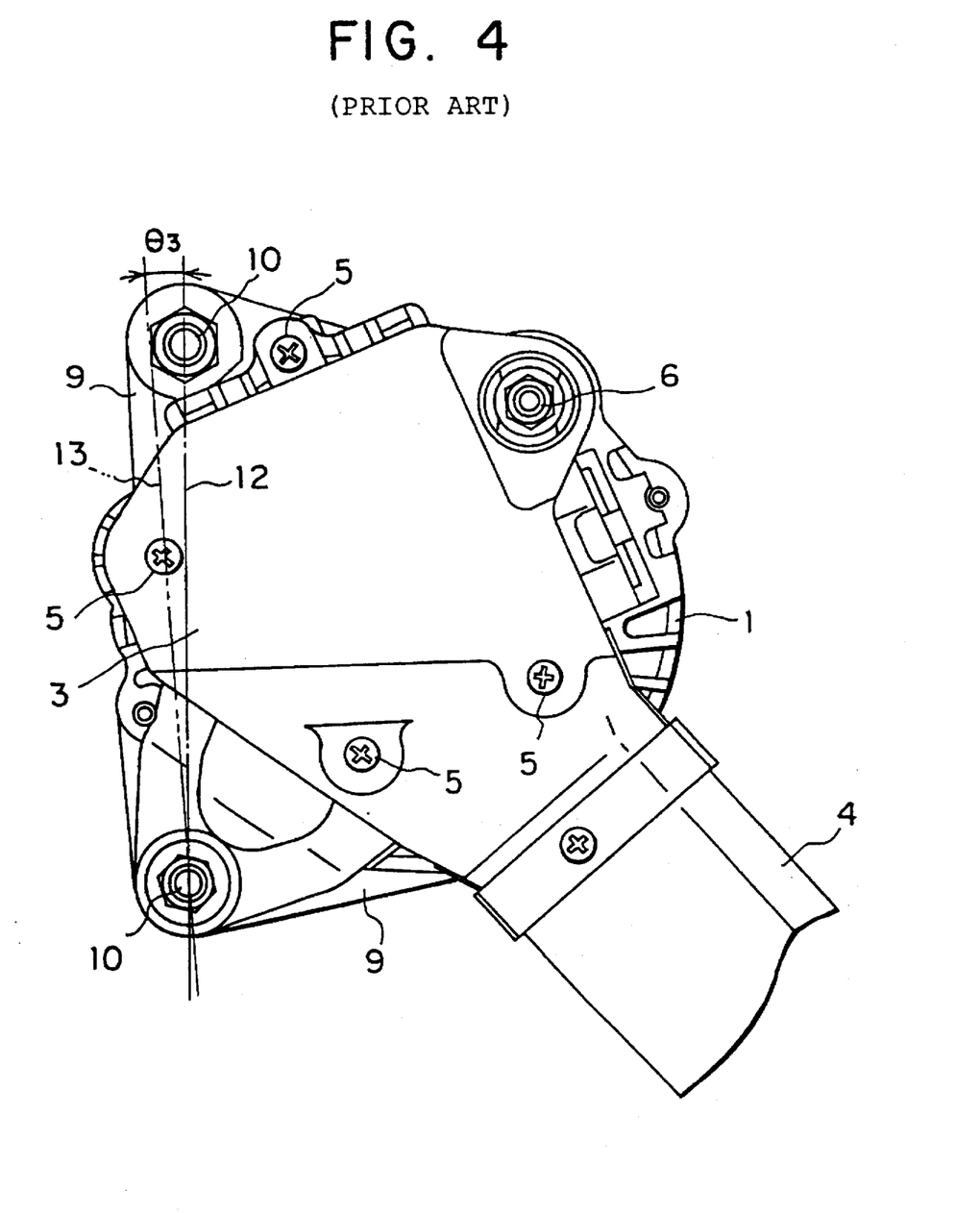
FIG. 4 is a view showing a conventional duct cover having a shape different from the duct cover shape shown in FIG. 3.

Furthermore, when a duct 4 is employed, the position of the intake vent for introducing air from outside the engine room is different for each type of vehicle. As set forth above, the fixing positions of the fixing bolts 10 vary depending upon the type of engine and the arrangement of the engine in the vehicle. However, as long as the duct 4 is applied to only one type of vehicle, the intake vent of the duct 4 is provided at the same position with respect to the engine room as shown in FIGS. 1, 3, and 4.

As set forth above, the relationship between the positions of the fixing bolts 10 and the output terminal 6 may be varied according to the type of engine, and the fixing positions of the fixing bolts 10 may also be varied according to the type of engine or the arrangement of the engine in the vehicle. Furthermore, the position of the intake vent of the duct 4 provided in the engine room varies depending on the type of vehicle.

Conventionally, there are provided duct covers 3 having different shapes depending on differences in the relationship among the positions of the fixing bolts 10 and the output terminal 6, in the fixing positions of the mounting bolts 10, and in the position of the intake vent of the duct 4.

Accordingly, it is necessary to provide various types of duct covers 3 having different shapes. For example, the output terminal 6 may be remote from the duct 4 as shown in FIG. 1; the output terminal 6 may be close to the duct 4 as shown in FIG. 4; or the upper fixing bolt 10 may be provided on the right side of the reference line 13. Thus, each duct cover 3 has no general-purpose use. As a result, the cost of the vehicle generator is increased.

Further, the extending direction of the duct may vary depending upon the types of engine. Since the conventional duct is integrally formed with the duct cover, it is necessary to modify, according to the extending direction of the duct, the integrally-formed structure including the duct cover and the duct. As a result, the same problem of an increase in the cost of the vehicle generator arises.

SUMMARY OF THE INVENTION

In order to overcome the above problems, it is an object of the present invention to provide a vehicle generator in which any one of a duct cover and a duct can be adjustably rotated in a circumferential direction of a bracket end surface, the duct cover having a unified shape irrespective of differences in the positions of fixing bolts for fixing the generator to an engine and an output terminal of the generator, in fixing positions of the fixing bolts, or in the position of an intake vent of the duct. The unified shape of the duct cover the results in a reduction in the cost of the generator.

According to the present invention, there is provided a vehicle generator having a duct cover, to cool a generator body by introducing outside air through a duct into an engine room, mounted between a bracket end, covering one side surface of the generator body, and the duct. The vehicle generator comprises a structure in which the duct cover has a single shape irrespective of the type of engine, the type of vehicle, and the arrangement of the engine room in which it is used, and either one of the duct cover and the duct can be adjustably rotated in a circumferential direction of the bracket end and attached to the bracket end.

As stated above, in the above aspect of the present invention, the duct cover has a single shape irrespective of the type of engine, the type of vehicle, and the arrangement of the engine room in which it is used. As a result, it is possible to realize a reduction in the cost of fabrication of the vehicle generator.

Further, since a duct cover having a single shape is employed, it is possible to provide a structure in which either one of the duct cover or the duct can be adjustably rotated in the circumferential direction of the bracket end and can be attached to the bracket end so as to set the intake vent of an duct at the optimal position relative to the bracket end. It is thereby possible to set the intake vent at the optimal position and attach the duct cover irrespective of the type of engine and vehicle, and of the arrangement of the engine room.

According to one aspect of the present invention, the duct cover can be adjustably rotated.

In the above aspect of the present invention, the duct cover has a cylindrical form with one end surface being blocked, and the cylindrical duct cover is attached in such a way that another end surface, having an opening, of the cylindrical duct cover faces the bracket end so as to cover an opening in the bracket end.

Further, the vehicle generator further comprises brackets covering two opposing side surfaces of the generator body, wherein a plurality of through-bolts for coupling both of the brackets are equally spaced on the circumference of both the brackets, and the duct cover is attached to the brackets by the through-bolts.

Still further, the through-bolts pass through the duct cover via through-bolt passing holes, each of the through-bolt passing holes being an elongated hole extending in a circumferential direction in the cylindrical duct cover, and the duct cover being adjustably attached to the bracket at different positions in the circumferential direction by changing the position of the through-bolts with respect to the elongated holes.

According to another aspect of the present invention, the structure is the one in which the duct can be adjustably rotated.

In the above aspect, the duct comprises a bent opening port coupled to an intake vent provided at an end surface of the duct cover, thereby allowing the duct to rotate along the end surface of the duct cover.

Alternatively, the duct comprises an opening port coupled to an intake vent which is provided at an end surface of the duct cover, the opening port of the duct including a bellows pipe, thereby allowing the duct to be bent at a section of the bellows pipe.

The above and further objects and novel features of the invention will be more apparent from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Embodiment 1

Figure 5:
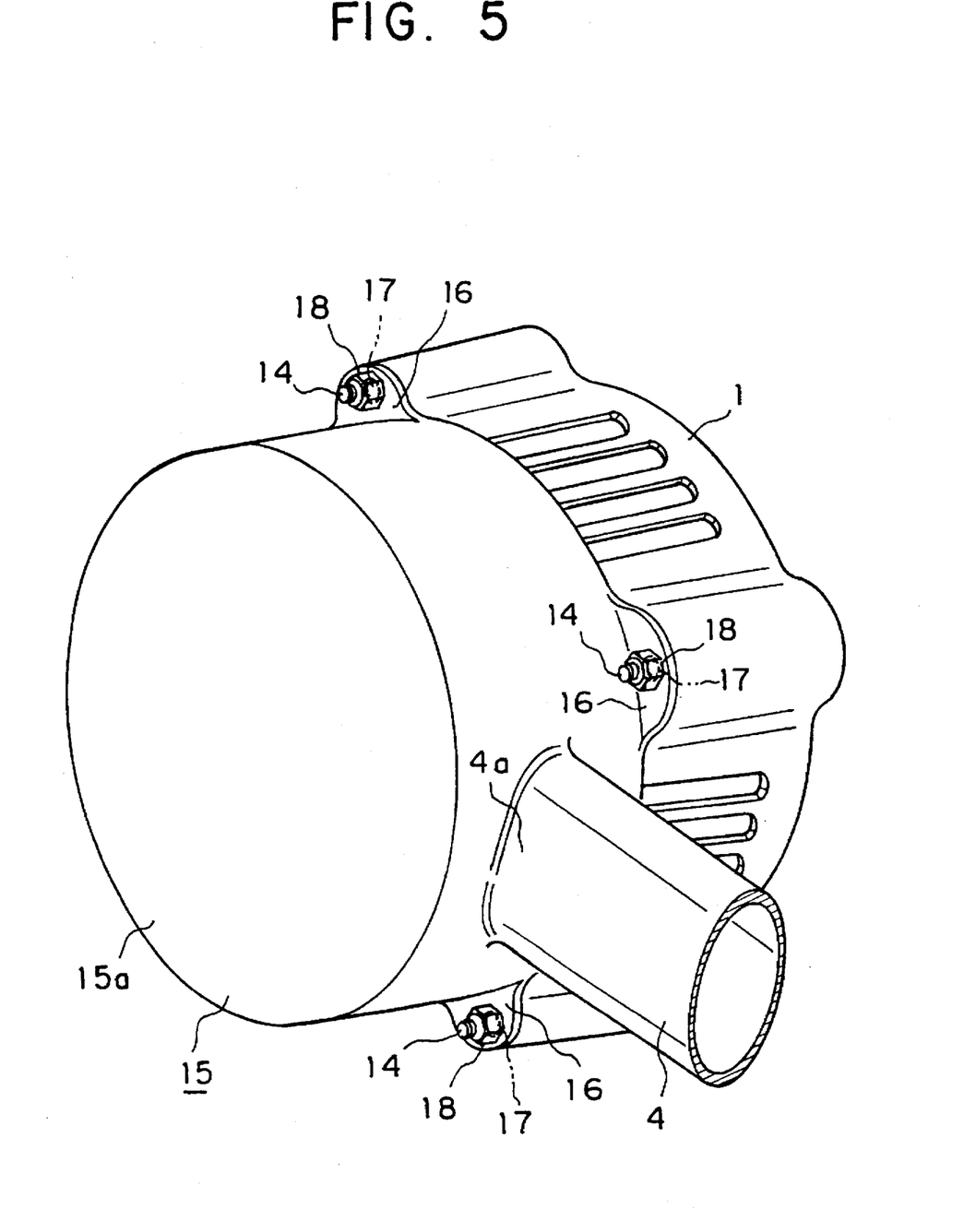
FIG. 5 is a rear side perspective view of an essential part of a vehicle generator according to embodiment 1 of the present invention.
Figure 6:
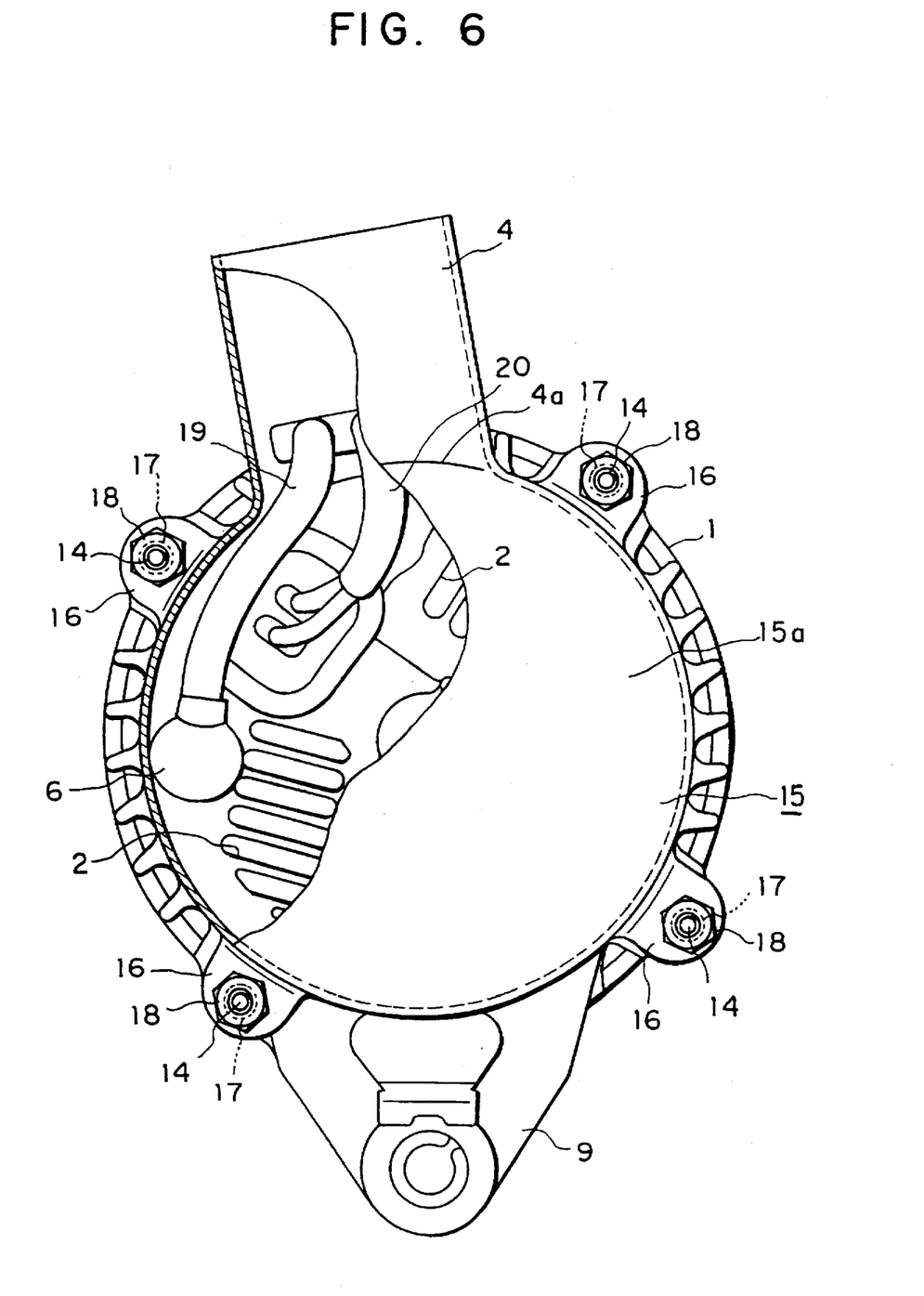
FIG. 6 is a rear side end surface view partially cut away of a duct cover of FIG. 5.

A description will now be given of one embodiment of the present invention referring to FIGS. 5 and 6. FIG. 5 is a rear side perspective view of an essential part of a vehicle generator according to this embodiment, and FIG. 6 is a rear side end surface view partially cut away of a duct cover. In the drawings, the same references are used for component parts identical with or equivalent to those in the conventional art, and descriptions thereof are omitted.

In FIGS. 5 and 6, reference numeral 4a indicates an intake vent of a duct 4, and 14 represents through-bolts passing through a rear side bracket 1. A plurality of through-bolts 14 (in the figures, four through-bolts are shown as an example) are equally spaced around the circumference of the rear side bracket 1. Reference numeral 15 indicates a cylindrical duct cover with one end surface 15a being blocked. While another opened end surface is facing the rear side bracket 1, the duct cover 15 is attached so as to cover an end surface opening of the rear side bracket 1. Reference numeral 16 indicates a plurality of mounting flanges (in the figures, four mounting flanges are shown as an example) equally spaced on an outer periphery of the duct cover 15 and having through-bolt holes 17 through which the through-bolts 14 pass. Reference numeral 18 indicates a clamping nut, 19 is a relay harness for an output terminal 6, and 20 is an input relay connector for adjusting voltage.

The duct cover 15 is rotated by the pitch between the through-bolts 14 (i.e., by 90 degrees in the figures) and is attached to the rear side bracket 1. That is, the duct cover 15 is attached to the rear side bracket 1 at a position which is modified by the pitch between the through-bolts 14 so as to set the intake vent 4a at the optimal position according to the type of engine and vehicle, and arrangement of the engine room in which it is used. It is thereby possible to adjustably change the direction of the duct 4 by 90 degrees in the circumferential direction of the rear side bracket 1.

The generator body (i.e., the rear side bracket 1) is fixed to an engine according to the type of engine and vehicle, and the arrangement of the engine room in which it is used. The duct cover 15 can be rotated with respect to the rear side bracket 1 as set forth above, so as to direct the duct 4 according to the type of vehicle and so forth. Thereafter, the duct cover 15 is attached to the rear side bracket 1 through the clamping nuts 18. In this case, a duct cover 15 having a single shape is sufficient even if the direction of the duct 4 is varied with respect to the engine. That is, the duct cover 15 needs to be made in only one illustrated shape, and can be applied to, for example, various types of vehicles requiring different fixing positions relative to the engine.

Embodiment 2

When duct cover 15 has a cylindrical shape as described in the above embodiment 1, an output terminal 6 and so forth can be housed in the duct cover 15. This shape does not interfere with rotation of the duct cover 15, and can be easily fabricated.

Embodiment 3

When a duct cover 15 is attached to a rear side bracket 1 via the through-bolts 14 equally spaced as described in the above embodiment 1, the duct cover 15 can be attached to the rear side bracket 1 at different positions by rotating the duct cover 15 by the pitch between the through-bolts 14. As a result, no special means is required to rotate the duct cover 15.

Embodiment 4

Figure 7:
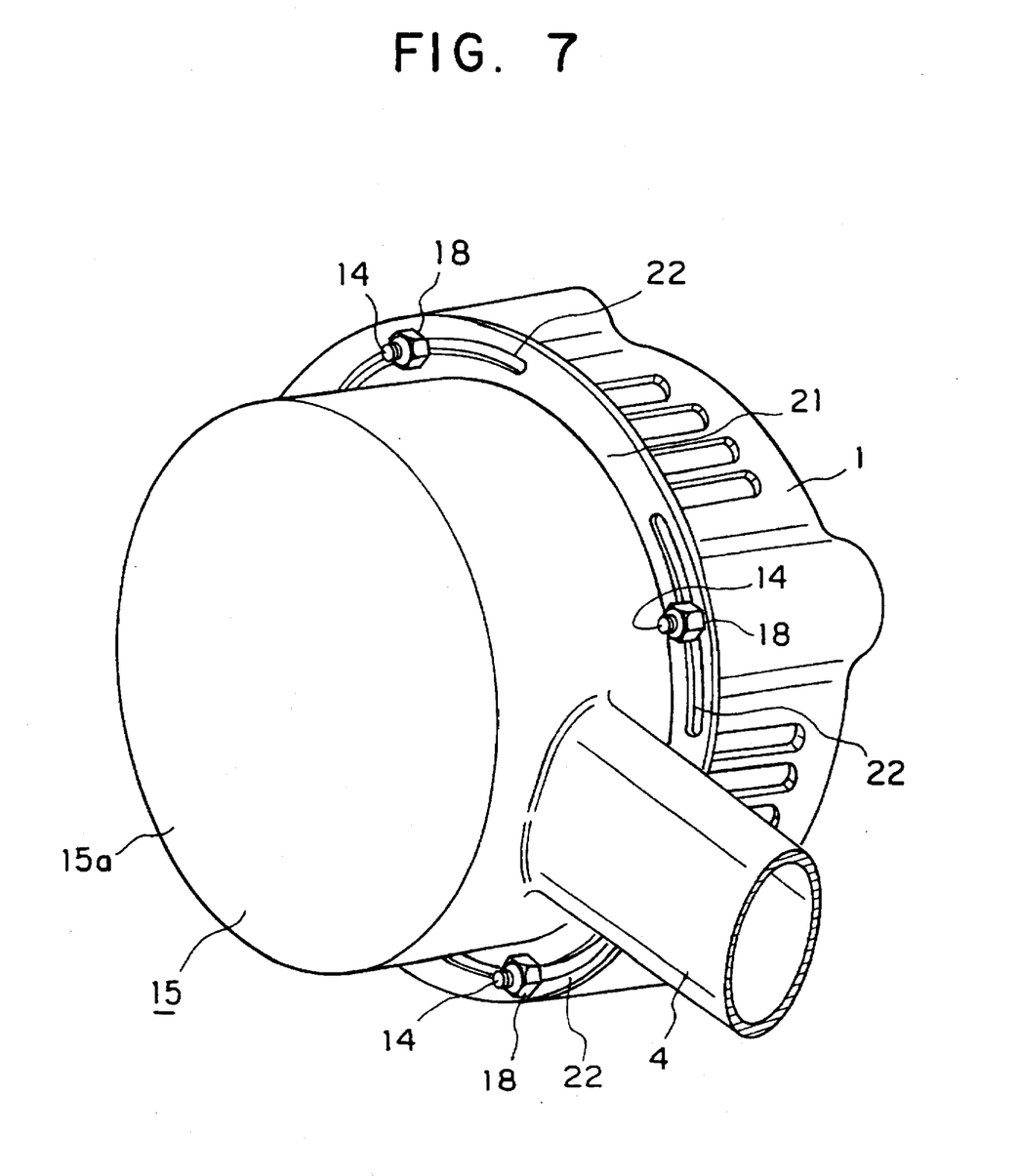
FIG. 7 is a rear side perspective view of an essential part of a vehicle generator according to embodiment 4 of the present invention.

Referring now to FIG. 7, a description will be given of embodiment 4 of the present invention. FIG. 7 is a perspective view of an essential part of a vehicle generator, as seen from the rear side, according to embodiment 4 of the present invention. In FIG. 7, the same reference numerals are used for component parts identical with or equivalent to those in FIG. 5, and descriptions thereof are omitted. In the drawing, reference numeral 21 indicates an annular mounting flange extending around the outer periphery of a duct cover 15, and 22 represents a plurality of through-bolt passing holes (in the figure, four through-bolt passing holes are shown as an example) which are provided in the annular mounting flange 21 to have an elongated hole structure extending circumferentially.

As set forth above, the through-bolt passing holes 22 in the duct cover 15 include the elongated holes extending along the mounting flange 21. Thus, the duct cover 15 can be adjustably attached to a rear side bracket 1 at different positions in the circumferential direction by positioning the through-bolts 14 differently with respect to the elongated holes 22. As a result, it is possible to successively rotate the duct cover 15 over the full length of the elongated hole, and to position the duct cover 15 with higher accuracy.

Embodiment 5

Figure 8:
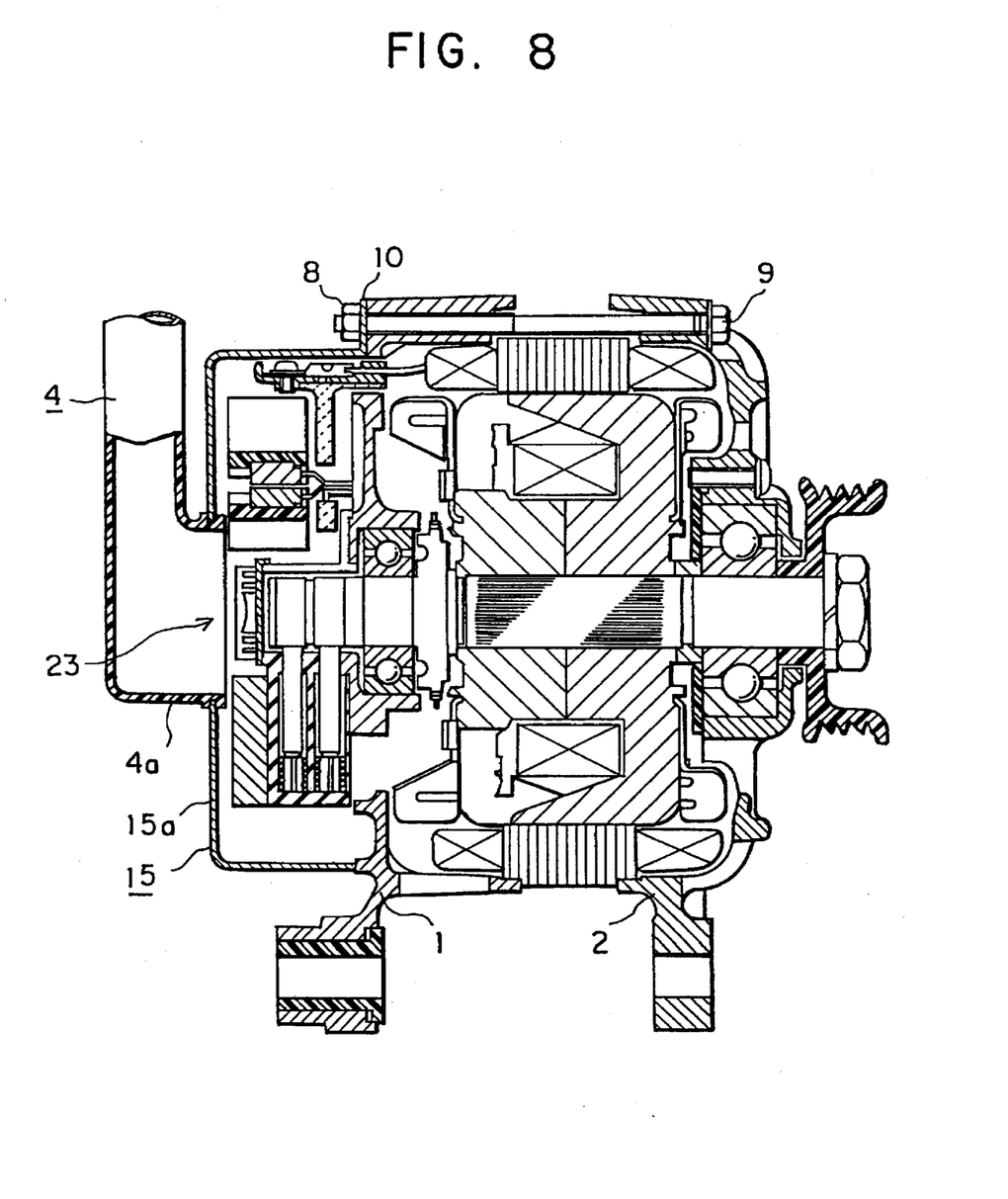
FIG. 8 is an axial sectional view of a vehicle generator according to embodiment 5 of the present invention.

In the above embodiments 1 to 4, the duct 4 is coupled to the outer peripheral side surface of the duct cover 15. As shown in FIG. 8, it is also possible to employ another structure in which an intake vent 23 is provided in one end surface 15a (at an intermediate position in the drawing) of the duct cover 15, and the intake vent 23 is coupled to a bent intake port 4a of the duct 4 extending along one end surface 15a of the duct cover 15. In this case, as in embodiment 1, the duct cover 15 can be adjustably rotated in a circumferential direction of a bracket 1, and the duct cover 15 can be selectively attached at a position to extend the duct 4 in the optimal direction depending on the type of vehicle or, etc. As a result, the duct cover 15 of only one shape is sufficient irrespective of the type of vehicle, etc.

Further, when the intake vent 23 in one end surface 15a of the duct cover 15 is coupled to the bent intake port 4a of the duct 4, outside air is introduced to the vicinity of the center of the duct cover 15 in the axial direction of a cooling air flow. As a result, cooling efficiency can be improved.

Embodiment 6

Figure 9:
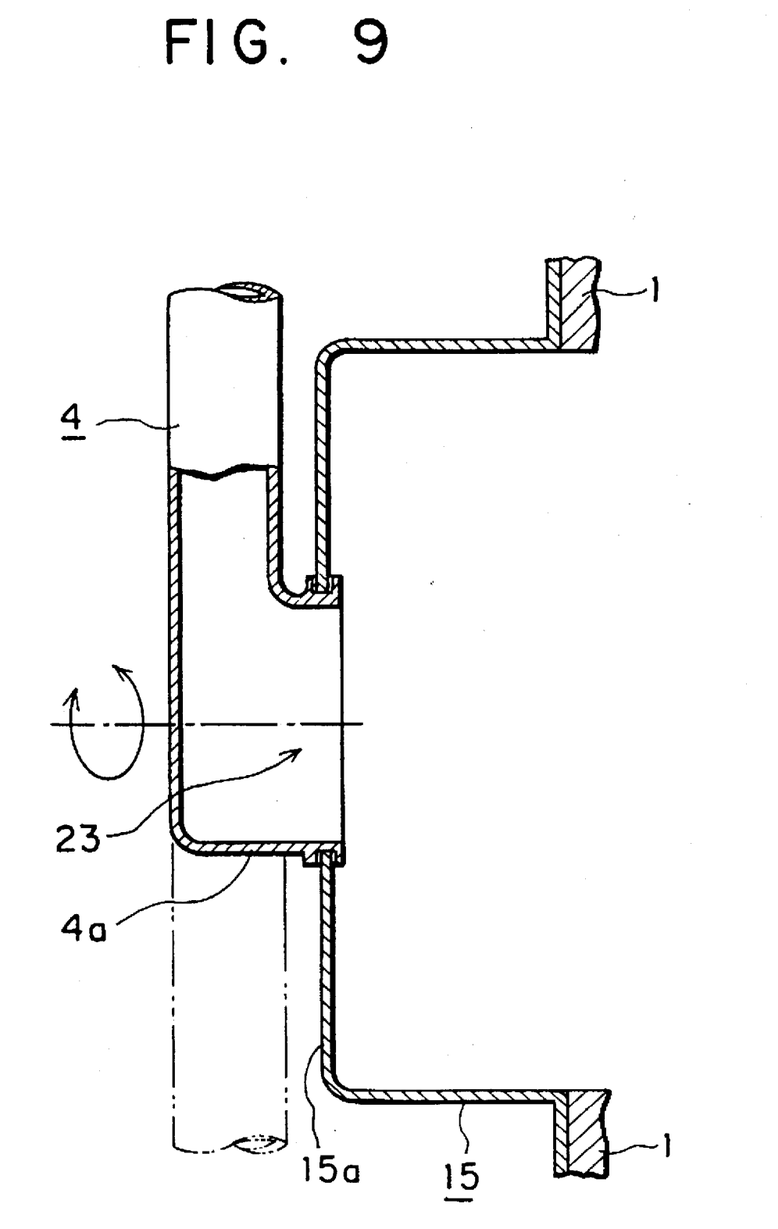
FIG. 9 is an axial sectional view of a vehicle generator according to embodiment 6 of the present invention.

In the above embodiments 1 to 5, the duct cover 15 can be adjustably rotated in a circumferential direction of a rear side bracket 1. However, as shown in FIG. 9, it is also possible to employ another structure in which the duct cover 15 is fixed to the rear side bracket 1 to prevent rotation, and the bent intake port 4a of the duct 4 is rotatably coupled to an intake vent 23 in the fixed duct cover 15. In FIG. 9, a groove is provided in the duct 4 at an engaging position between the bent intake port 4a of the duct 4 and the duct cover 15, and an end of the duct cover 15 is fitted into the groove.

When the duct 4 can be rotated about the bent intake port 4a as described above, it is possible to set the duct 4 in a desired direction by rotating the duct 4 after the duct cover 15 is fixed to the rear side bracket 1. Therefore, according to a fixing position of the duct cover 15 with respect to an engine, the direction of the duct 4 can be changed, and the shape of the duct cover 15 can be unified. Further, the duct cover 15 can simply be fixed to the rear side bracket 1 irrespective of the direction of the duct 4 as described above, resulting in a facilitated mounting operation.

Embodiment 7

Figure 10:
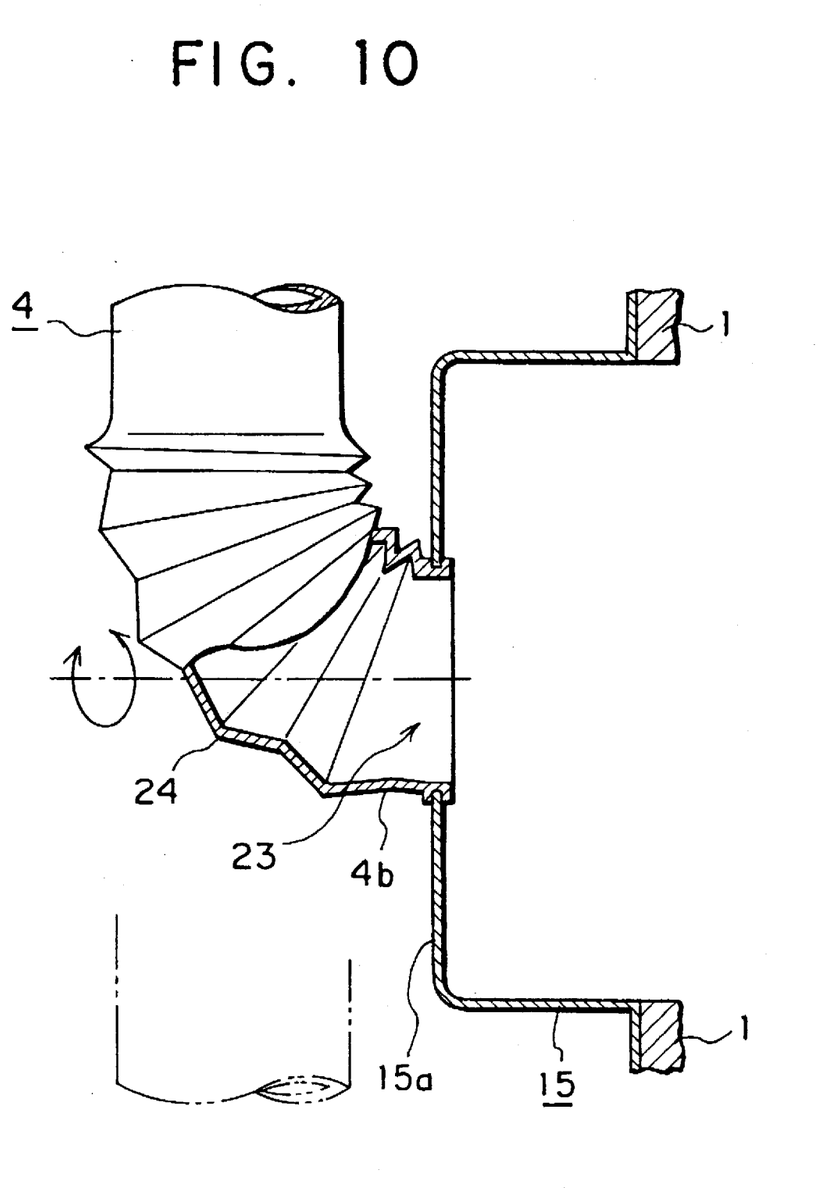
FIG. 10 is an axial sectional view of a vehicle generator according to the embodiment 7 of the present invention.

Alternatively, it is possible to provide another structure as shown in FIG. 10, in which the duct cover 15 is fixed to the rear side bracket 1 to prevent rotation, and an intake port 4b of the duct 4 is coupled to an intake vent 23 in the fixed duct cover 15. Further, in this structure, a bellows pipe 24 extends in the vicinity of the intake port 4b fixedly coupled to the fixed duct cover 15, and the duct 4 is bent at a section of the bellows pipe 24.

As stated above, the bellows pipe 24 extends in the vicinity of the intake port 4b of the duct 4, and the duct 4 is bent at the section of the bellows pipe 24. In this case, it is possible to set the duct 4 in a desired direction by bending the duct 4 at the section of the bellows pipe 24 after the duct cover 15 is fixed to the rear side bracket 1. Therefore, according to a fixed position of the duct cover 15 with respect to an engine, the direction of the duct 4 can be changed, and the shape of the duct cover 15 can be unified. Further, as in the above embodiment 6, the duct cover 15 can simply be fixed to the rear side bracket 1 irrespective of the direction of the duct 4 as described above, resulting in a facilitated mounting operation.

As is apparent from the foregoing, according to the present invention, the duct cover can have a single shape irrespective of the type of engine and vehicle, and of the arrangement of the engine room in which it is used. As a result, it is possible to provide a cost reduction in the fabrication of the vehicle generator.

Further, since the duct cover having a single shape is employed, it is possible to provide a structure in which any one of the duct cover and a duct can be adjustably rotated in a circumferential direction of a bracket end and can be attached to the bracket end so as to set an intake vent of the duct at an optimal position with respect to the bracket end. It is thereby possible to provide the intake vent at the optimal position irrespective of the type engine and vehicle, and of the arrangement of the engine room in which it is used.

While preferred embodiments of the invention have been described using specific terms, this description is for illustrative purposes only, and it is to be understood that changes and variations may be made without departing from the spirit or scope of the following claims.

What is claimed is:

1. A vehicle generator having a duct cover to cool a generator body by introducing outside air through a duct into an engine room, said duct cover being disposed between a bracket end, covering one side surface of said generator body, and said duct, wherein one of said duct cover and said duct is attached to said bracket end and adjustably rotatable in a circumferential direction of said bracket end.

2. A vehicle generator having a duct cover according to claim 1, wherein said duct cover is adjustably rotatable.

3. A vehicle generator having a duct cover according to claim 2, wherein said duct cover has a cylindrical form with one end surface being blocked, and said duct cover is attachable to said bracket end such that another end surface, having an opening, of said duct cover faces said bracket end to cover an opening in said bracket end.

4. A vehicle generator having a duct cover according to claim 3 further comprising brackets covering two opposing side surfaces of said generator body, wherein a plurality of through-bolts for coupling both of said brackets are equally spaced in a circumferential direction of both said brackets, and said duct cover is attached to said brackets by said through-bolts.

5. A vehicle generator having a duct cover according to claim 4, wherein said through-bolts as passable through said duct cover via through-bolt passing holes, each of said through-bolt passing holes being an elongated hole extending in a circumferential direction of said cylindrical duct cover, and said duct cover being adjustably attachable to said bracket at different positions in the circumferential direction by changing the positions of said through-bolts with respect to said elongated holes.

6. A vehicle generator having a duct cover according to claim 1, wherein said duct is adjustably rotatable.

7. A vehicle generator having a duct cover according to claim 6, wherein said duct cover has an end surface, said end surface has an intake vent, and said duct comprises a bent intake port coupled to said intake vent, thereby allowing said duct to rotate along the end surface of said duct cover.

8. A vehicle generator having a duct cover according to claim 6, wherein, in said structure in which said duct is adjustably rotatable, said duct comprises an opening port coupled to an intake vent which is provided at an end surface of said duct cover, said opening port of said duct including a bellows pipe, thereby allowing said duct to be bent at a section of said bellows pipe.

* * * * *